(12) United States Patent
Campanella et al.

(10) Patent No.: US 11,776,235 B2
(45) Date of Patent: Oct. 3, 2023

(54) SYSTEM, METHOD AND COMPUTER-ACCESSIBLE MEDIUM FOR QUANTIFICATION OF BLUR IN DIGITAL IMAGES

(71) Applicant: MEMORIAL SLOAN KETTERING CANCER CENTER, New York, NY (US)

(72) Inventors: Gabriele Campanella, New York, NY (US); Peter J. Schüffler, New York, NY (US); Thomas Fuchs, New York, NY (US)

(73) Assignee: Memorial Sloan-Kettering Cancer Center, New York, NY (US)

( * ) Notice: Subject to any disclaimer, the term of this patent is extended or adjusted under 35 U.S.C. 154(b) by 343 days.

(21) Appl. No.: 17/134,886

(22) Filed: Dec. 28, 2020

(65) Prior Publication Data

US 2021/0295111 A1 Sep. 23, 2021

Related U.S. Application Data

(63) Continuation of application No. 16/328,996, filed as application No. PCT/US2017/049378 on Aug. 30, 2017, now Pat. No. 10,878,293.

(60) Provisional application No. 62/381,363, filed on Aug. 30, 2016, provisional application No. 62/410,136, filed on Oct. 19, 2016.

(51) Int. Cl.
| | |
|---|---|
| *G06K 9/00* | (2022.01) |
| *A61K 35/12* | (2015.01) |
| *G06V 10/30* | (2022.01) |
| *G06V 20/69* | (2022.01) |

(Continued)

(52) U.S. Cl.
CPC .............. *G06V 10/30* (2022.01); *G06F 18/00* (2023.01); *G06F 18/2415* (2023.01); *G06V 20/695* (2022.01)

(58) Field of Classification Search
CPC .............. G06K 9/00; G21K 7/00; A61K 35/12
USPC ....... 382/100, 103, 106, 128–134, 156, 162, 382/168, 173, 181, 190, 199, 224, 254, 382/255, 274–276, 305, 219; 345/156; 378/43, 23
See application file for complete search history.

(56) References Cited

U.S. PATENT DOCUMENTS

| | | | |
|---|---|---|---|
| 9,298,968 B1 * | 3/2016 | Peljto ..................... | G06V 20/69 |
| 2006/0139318 A1 * | 6/2006 | Kariathungal ......... | G16H 30/20 |
| | | | 345/156 |

(Continued)

OTHER PUBLICATIONS

International Search Report and Written Opinion in International Application No. PCT/US2017/049378, dated Nov. 29, 2017.

(Continued)

*Primary Examiner* — Seyed H Azarian
(74) *Attorney, Agent, or Firm* — Bookoff McAndrews, PLLC

(57) ABSTRACT

The present disclosure discusses systems and methods to detect blur in digital images. The solution can be incorporated into the quality control systems of pathology and other slide scanners or can be a stand-alone solution. The solution can identify scanned images that include blur and cause the scanner to automatically rescan the blurry image. The solution can also identify regions of the scanned image that include blur. The solution can generate blur maps for each of the scanned images that identify regions of the scanned image that include blur.

14 Claims, 15 Drawing Sheets

(51) Int. Cl.
*G06F 18/2415* (2023.01)
*G06F 18/00* (2023.01)

(56) References Cited

U.S. PATENT DOCUMENTS

| | | | |
|---|---|---|---|
| 2011/0044524 A1* | 2/2011 | Wang | G01R 33/5601 |
| | | | 382/131 |
| 2014/0023266 A1* | 1/2014 | Bertheau | G06T 5/003 |
| | | | 382/162 |
| 2014/0233826 A1* | 8/2014 | Agaian | G16H 50/20 |
| | | | 382/133 |
| 2015/0065803 A1 | 3/2015 | Douglas et al. | |
| 2015/0110372 A1* | 4/2015 | Solanki | A61B 3/14 |
| | | | 382/130 |

OTHER PUBLICATIONS

Notice of Allowance in U.S. Appl. No. 16/328,996, dated Aug. 28, 2020.

* cited by examiner

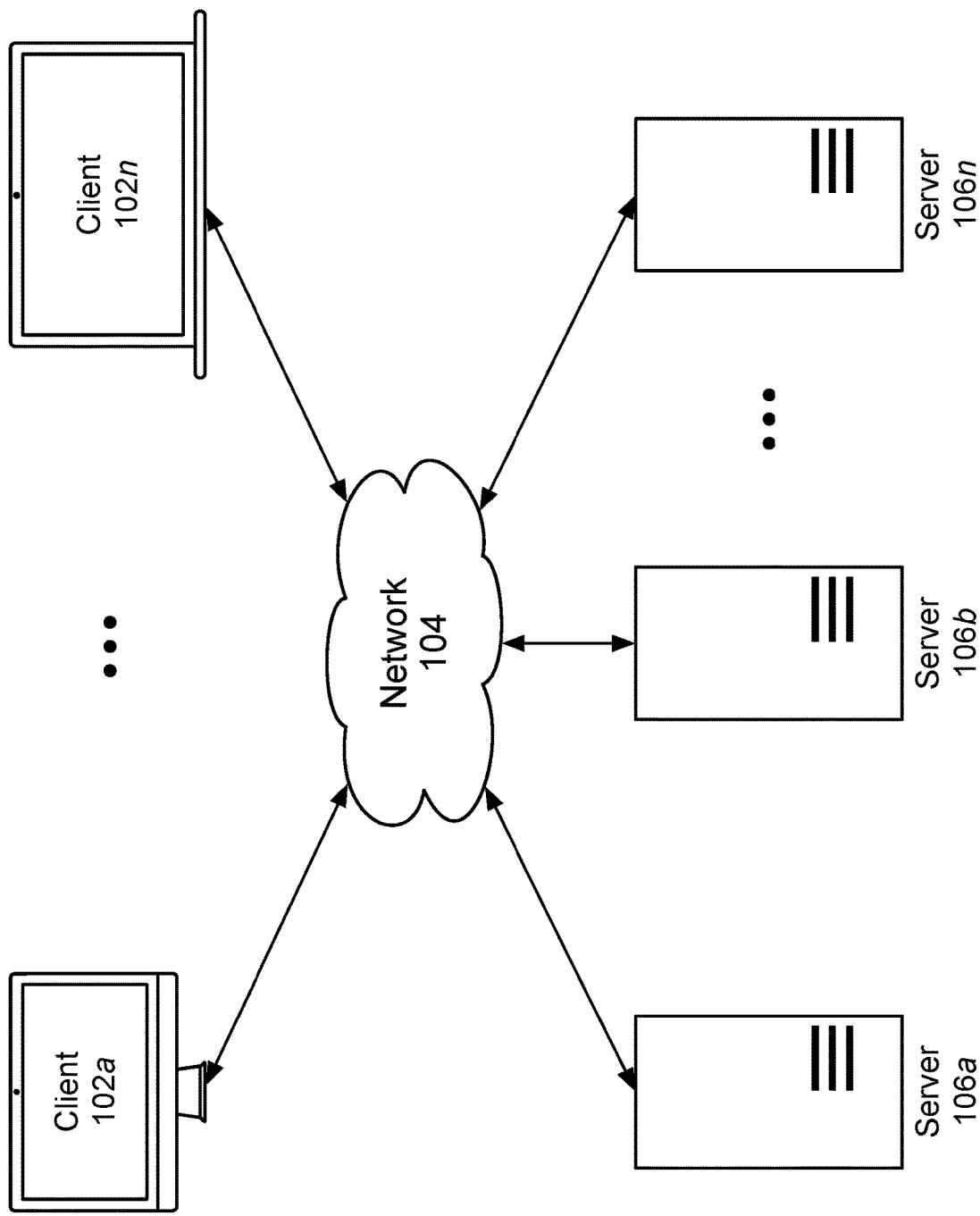

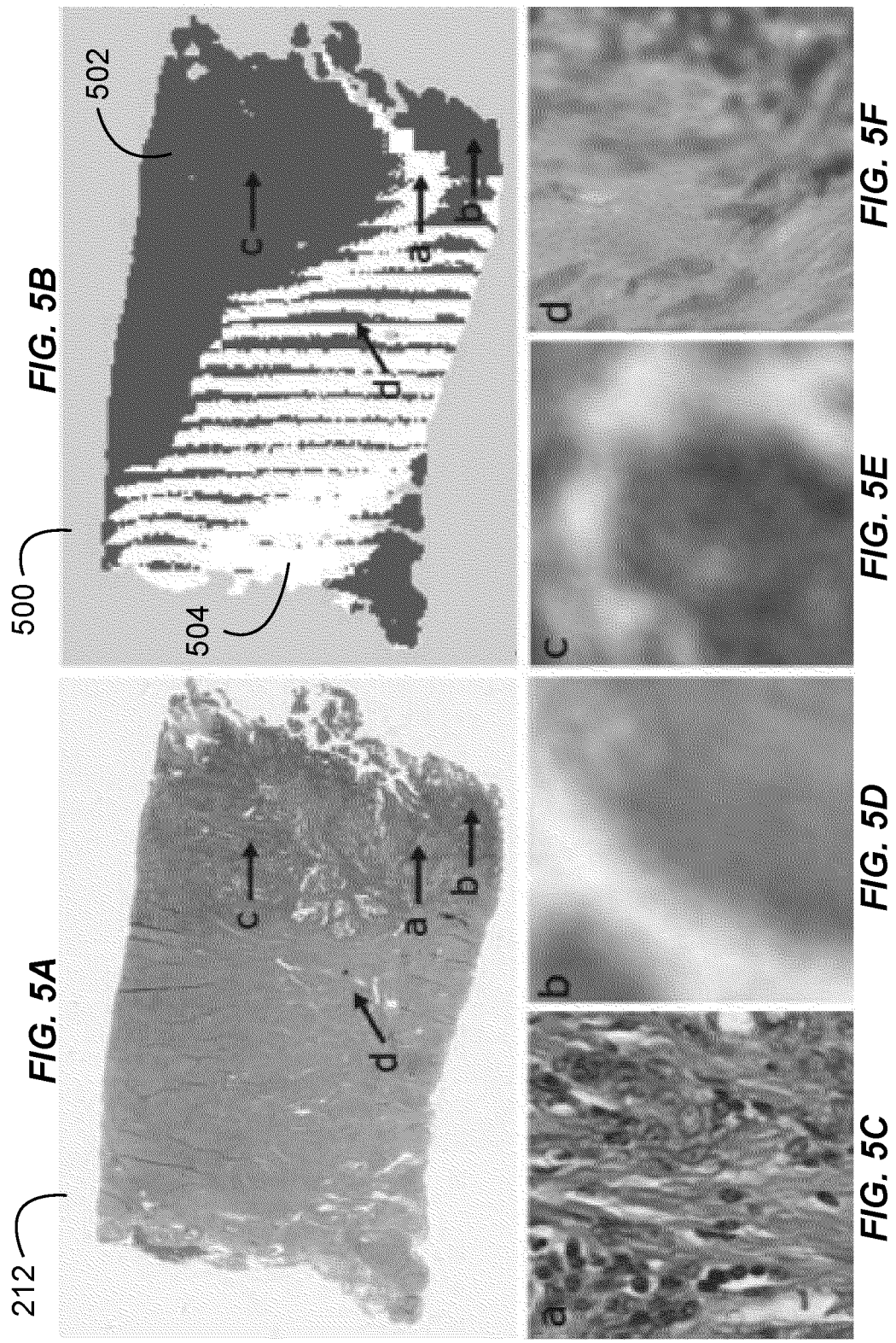

SYSTEM, METHOD AND COMPUTER-ACCESSIBLE MEDIUM FOR QUANTIFICATION OF BLUR IN DIGITAL IMAGES

CROSS-REFERENCE TO RELATED APPLICATIONS

This application claims priority as a continuation of U.S. patent application Ser. No. 16/328,996, filed Feb. 27, 2019, which claims priority to International Patent Application No. PCT/US2017/049378, filed Aug. 30, 2017, which claims priority to U.S. Provisional Patent Application No. 62/410,136, filed Oct. 19, 2016, and to U.S. Provisional Patent Application No. 62/381,363, filed Aug. 30, 2016. The foregoing applications are herein incorporated by reference in their entirety.

BACKGROUND OF THE DISCLOSURE

Pathology review is traditionally conducted with analog (or physical) slides. At a major hospital, the digitization of the slides would require the scanning of tens of thousands of digital slides per month. One bottleneck of high-throughput scanning is quality control (QC). Currently, digital slides are screened manually to detect out of focus regions and other defects in the scanned slides.

SUMMARY OF THE DISCLOSURE

According to an aspect of the disclosure, a system to prepare histological slides includes one or more processors. The system can include a patch generator that is executed by the one or more processors to generate a plurality of patches from a digital image. Each patch of the plurality of patches can include a plurality of pixels. The system can include a feature extractor to calculate, for each patch of the plurality of patches, values according to one or more sharpness metrics. The system can include a patch classifier to determine a blur score for each patch of the plurality of patches. The blur score of the patch can be determined using the calculated values of the one or more sharpness metrics of the patch. The patch classifier can generate a blur map based on the blur score for each patch of the plurality of patches. The blur map can include, for each patch of the plurality of patches, a parameter value between a first threshold value and a second threshold value that is based on the blur score of the patch.

In some implementations, the patch classifier can determine the blur score for each of the plurality of patches with one of a random forest regression algorithm or a logistic regression algorithm. In some implementations, the patch classifier can determine the blur score for each of the plurality of patches with a residual neural network.

In some implementations, the system can include a background detector to discard patches that includes background data. In some implementations, a portion of a first of the plurality of patches can overlap a portion of a second of the plurality of patches.

In some implementations, the feature extractor can calculate a plurality of values for each patch in the group of the plurality of patches. The one or more sharpness metrics can include at least one pixel intensity-based feature, gradient-based feature, transform-based feature, and perceptual-based feature. The one or more sharpness metrics can include a variance metric, a range histogram metric, an entropy histogram metric, a Mason and Green's histogram metric, a Mendelsohn and Mayall's histogram metric, a gradient metric, a sum of modified laplacian metric, a Tenengrad metric, a blur metric in the frequency domain, a DCT blur metric, a Haar wavelet transform metric, a Marziliano metric, and a cumulative probability of blur detection metric.

In some implementations, the system can include a background detector to convert the image to a grayscale image. The patch classifier can flag each patch in the group of the plurality of patches having the blur score above a predetermined threshold and can generate the blur map based on the flagged patches.

According to an aspect of the disclosure, a method for detecting a quantity of blur in images can include generating, by a blur detector including one or more processors, a plurality of patches from a digital image. Each patch of the plurality of patches can include a plurality of pixels. The method can include calculating, by the blur detector, for each patch of the plurality of patches, values according to one or more sharpness metrics. The method can include determining, by the blur detector, a blur score for each patch of the plurality of patches. The blur score of the patch can be determined using the calculated values of the one or more sharpness metrics of the patch. The method can include generating, by the blur detector, a blur map based on the blur score for each patch of the plurality of patches. The blur map can include, for each patch of the plurality of patches, a parameter value between a first threshold value and a second threshold value that is based on the blur score of the patch.

In some implementations, the method can include determining, by the blur detector, the blur score for each of the plurality of patches with one of a random forest regression algorithm or a logistic regression algorithm. In some implementations, the blur score for each of the plurality of patches can be calculated with a residual neural network.

In some implementations, the method can include discarding, by the blur detector, a patch that comprises background data. A portion of a first of the plurality of patches can overlap a portion of a second of the plurality of patches.

The method can include calculating, by the blur detector, a plurality of values for each patch in the group of the plurality of patches. The one or more sharpness metrics can include at least one pixel intensity-based feature, gradient-based feature, transform-based feature, or perceptual-based feature. The one or more sharpness metrics can include a variance metric, a range histogram metric, an entropy histogram metric, a Mason and Green's histogram metric, a Mendelsohn and Mayall's histogram metric, a gradient metric, a sum of modified laplacian metric, a Tenengrad metric, a blur metric in the frequency domain, a DCT blur metric, a Haar wavelet transform metric, a Marziliano metric, or a cumulative probability of blur detection metric.

The method can include converting the image to a grayscale image. The method can include flagging, by the blur detector, each patch in the group of the plurality of patches having the blur score above a predetermined threshold, and generating, by the blur detector, the blur map based on the flagged patches.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device;

FIG. 5A illustrates a pathology image.

FIG. 5B illustrates a blur map for the pathology image illustrated in FIG. 5A.

FIGS. 5C-5F illustrate patches from the pathology image illustrated in FIG. 5A.

DETAILED DESCRIPTION

Figure 1B:
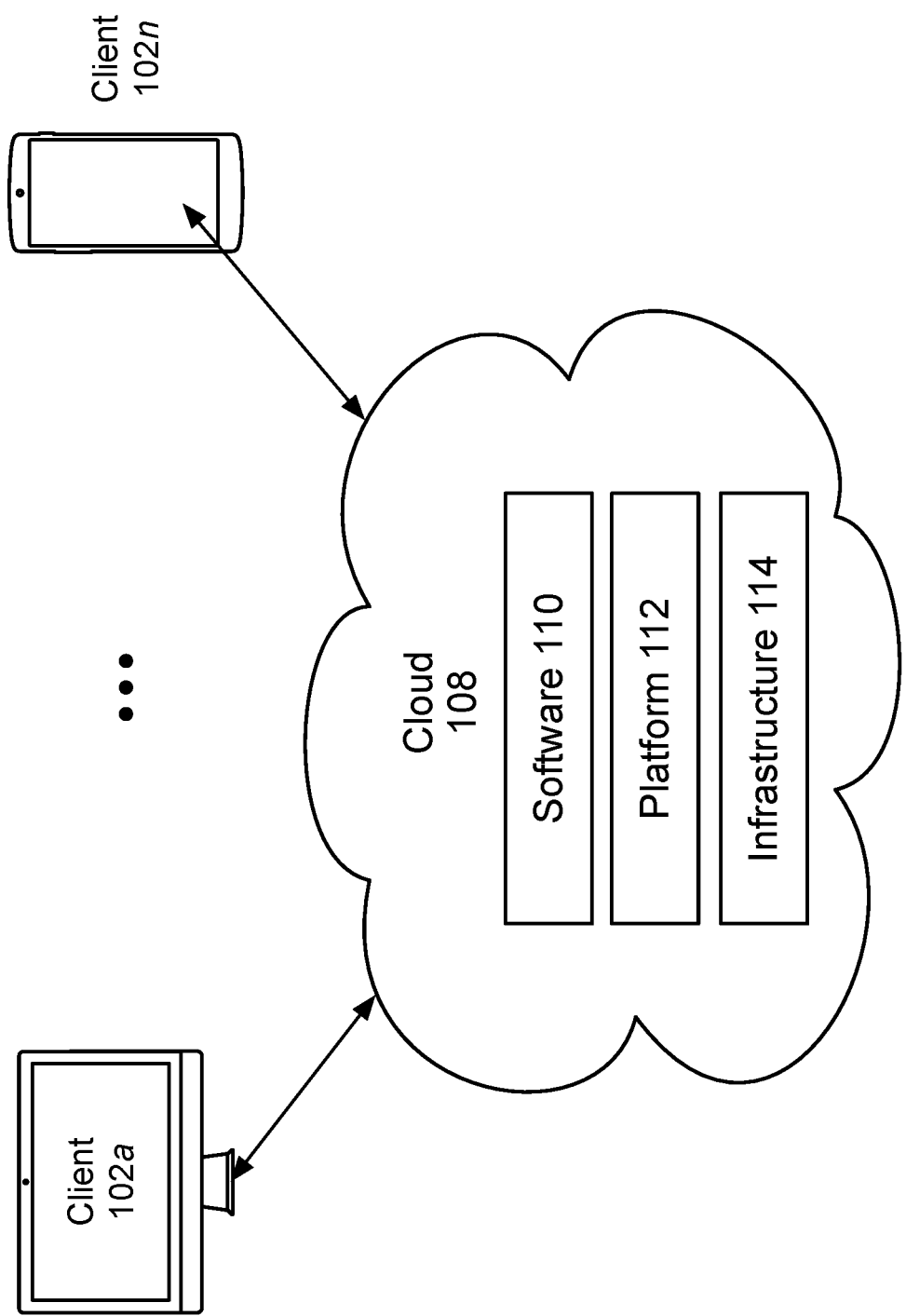
FIG. 1B is a block diagram depicting a cloud computing environment comprising a client device in communication with cloud service providers.

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods to detect blur and generate blur maps.

Section C describes embodiments of system and method to determine saliency of tissue.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although, FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
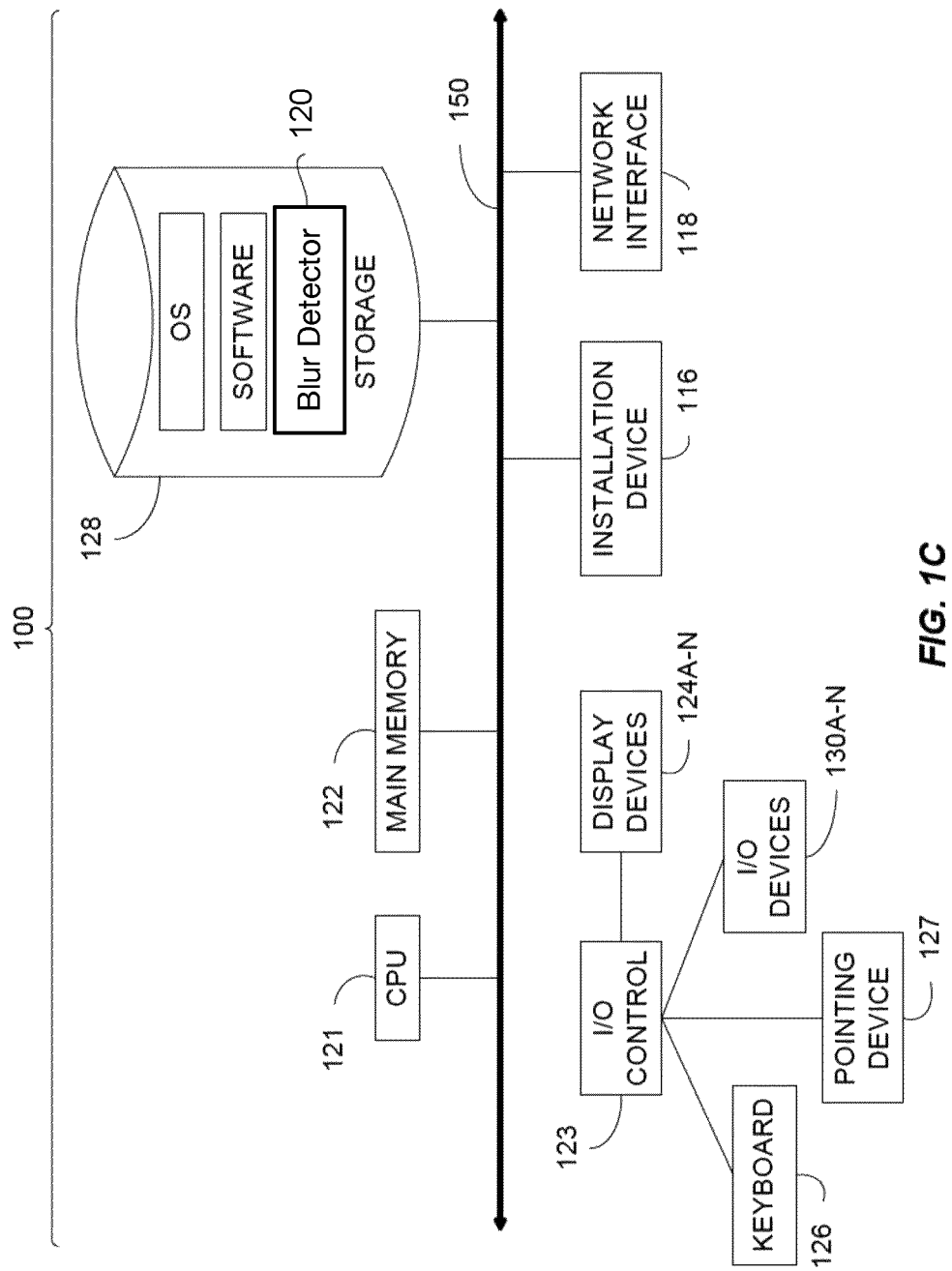
FIGS. 1C and 1D are block diagrams depicting embodiments of computing devices useful in connection with the methods and systems described herein.
Figure 1D:
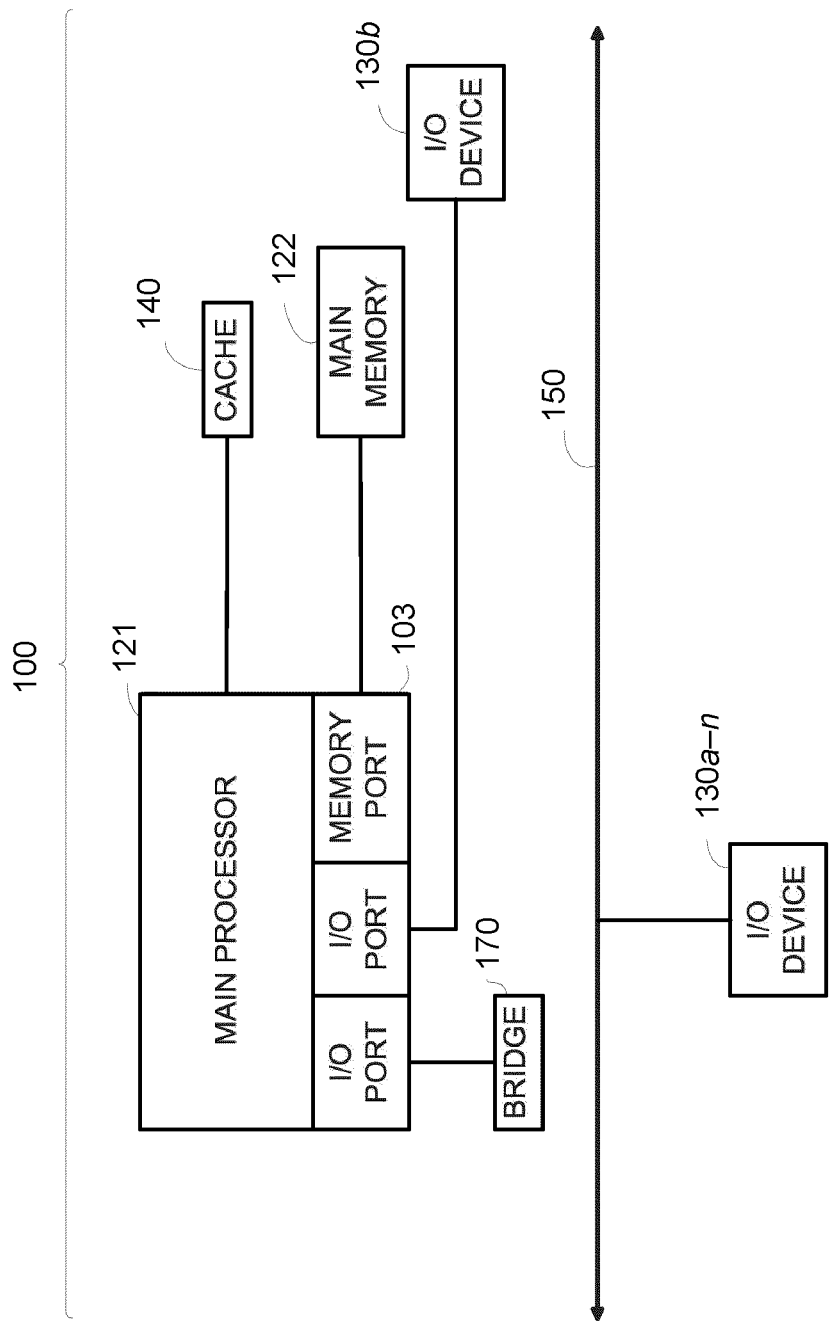

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of blur detector 120 and saliency detector 414. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random-access memory (DRAM) or any variants, including static random-access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the image classification system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections).

In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods to Detect Blur

The present disclosure describes systems and methods to detect blur in digital images. The solution can be incorporated into the quality control systems of pathology and other slide scanners or can be a stand-alone solution. The solution can identify scanned images that include blur and cause the scanner to automatically rescan the blurry image. The solution can also identify regions of the scanned image that include blur. The solution can generate blur maps for each of the scanned images that identify regions of the scanned image that include blur. A blur map can be similar to a heat map. The blur map can indicate a degree of blurring at various regions within an image. Subsequent workflows can use the blur maps during the analysis of the scanned images. For example, when classifying the content of the scanned image, automated classification systems can ignore regions of the scanned images that the blur maps indicate include an amount of blur that exceeds a predetermined threshold.

Figure 2:
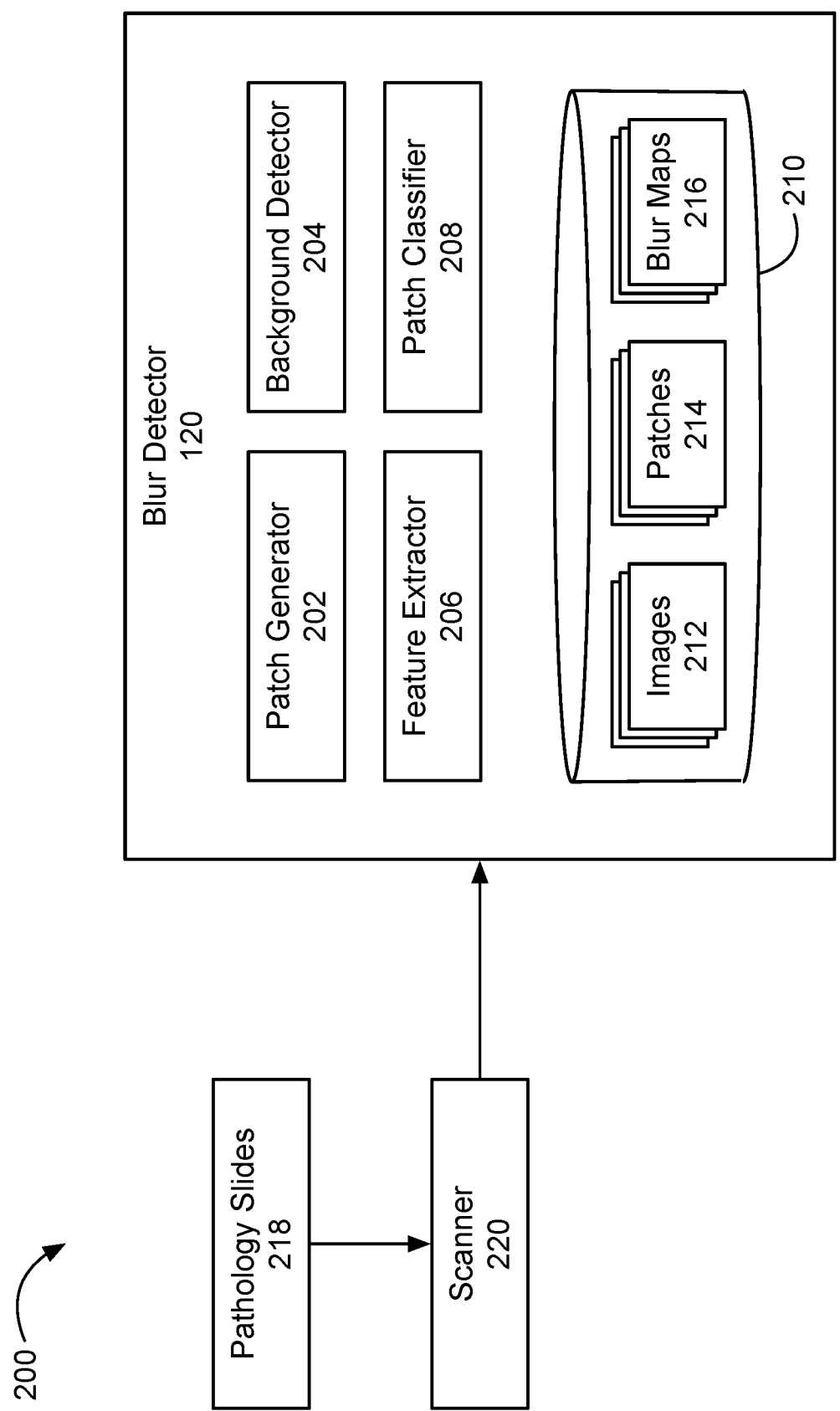
FIG. 2 illustrates a block diagram of an example blur detection system.

FIG. 2 illustrates a block diagram of an example blur detection system 200. The system 200 includes the blur detector 120. The blur detector 120 includes a patch generator 202, a background detector 204, a feature extractor 206, and a patch classifier 208. The blur detector 120 includes a database 210. The database 210 can store images 212, patches 214, and blur maps 216. The images 212 can be generated from pathology slides 218. The pathology slides 218 can be digitized with a scanner 220. In some implementations, the blur detector 120 is a component of the scanner 220. For example, the blur detector 120 can be a component of the scanner's quality control system.

In some implementations, the patch generator 202, background detector 204, feature extractor 206, and the patch classifier 208 can each be implemented as a set of software instructions, computer code, or logic that performs the functionality of each of these components as described further below. In some implementations, these components may instead by implemented by hardware, for example, using one or more field programmable gate arrays (FPGAs) and/or one or more application-specific integrated circuits (ASICs). In some implementations, these components can be implemented as a combination of hardware and software.

The blur detector 120 can receive digitized pathology slides 218 at an interface. The pathology slides 218 can be microscope slides that include excised tissue samples. The tissue samples can be prepared and stained according to pathology workflows to enable a pathologist to diagnose based on the prepared pathology slides 218. The pathology slides 218 can be digitized with the scanner 220. The scanner 220 can be a high-throughput scanner that automatically scans prepared pathology slides 218. For example, the scanner 220 can be an Aperio AT2 whole slide scanner (made available by Leica Biosystems) or a Nanozoomer C9600 virtual slide light microscope scanner (made available by HAMAMATSU).

The blur detector 120 can include a patch generator 202. The patch generator 202 can be any script, file, program, application, set of instructions, or computer-executable code that is configured to enable a computing device on which the patch generator 202 is executed to divide an input image 212 into a plurality of patches 214. The patch generator 202 can store the generated patches 214 in the database 210. In general, a patch 214 can refer to a portion of an image 212 and includes a plurality of pixels. The patch generator 202 can divide each image 212 into multiple patches 214. In some implementations, the patch generator 202 can divide an image 212 into a plurality of patches according to a grid overlay. For example, the patch generator 202 can divide an image 212 having a resolution of 1,000 pixels by 1,000 pixels into patches each representing an adjacent square portion of the image 212 with a resolution of 10 pixels by 10 pixels, thereby creating 10,000 patches for the image 212.

The patch generator 202 can be configured to generate the patches 214 in different shapes or fashions. For example, the patch generator 202 can generate patches 214 that have rectangular or irregular shapes. The patch 214 may not all have a uniform size. For example, portions of the image 212 that include background data can be divided into larger patches 214, and the portions of the image 212 that include tissue can be divided into smaller patches 214. The patches 214 can overlap one another. For example, the patch generator 202 can use a sliding window to generate a first patch 214 that overlaps a second patch 214 by 50%. A portion of an image 212 may be included within more than one patch for that image 212.

In some implementations, the patch generator 202 can also provide data augmentation or other pre-processing of the patches 214. For example, the patch generator 202 can apply a color normalization, intensity normalization, or other image processing technique to some or all of the patches 214. In some implementations, the patch generator 202 can convert the images 212 into black and white images 212.

The blur detector 120 can include a background detector 204. The background detector 204 can be any script, file, program, application, set of instructions, or computer-executable code that is configured to enable a computing device on which the background detector 204 is executed to detect background portions of the image 212. The pathology slides 218 include sectioned tissue. The tissue can include voids or may not extend to the perimeter of the pathology slides 218. When the patch generator 202 digitizes the pathology slides 218, the voids or other open areas in the slide can be recorded as background. The background can be portions of the images 212 that do not include tissue image data. The background detector 204 can process each of the patches 214 and indicate whether the respective patch 214 contains substantially background image data or tissue image data. The background detector 204 can flag, tag, label, or otherwise identify or indicate a patch 214 that is found to include substantially only tissue image data. The background detector 204 can flag patches 214 that include more than 50%, 60%, 70%, or 80% tissue image data. When flagged, the blur detector 120 can further process the image 212. The background detector 204 can discard patches 214 that include substantially background data.

The blur detector 120 can include a feature extractor 206. The feature extractor 206 can be any script, file, program, application, set of instructions, or computer-executable code that is configured to enable a computing device on which the feature extractor 206 is executed to calculate feature values for each of the patches 214 according to one or more sharpness metrics. The feature extractor 206 can calculate feature values by applying different sharpness metrics to the image data included in each of the patches 214. Each of the feature values can be a single value, a vector, or a multidimensional matrix. The feature extractor 206 can use sharpness metrics from a plurality of different categories. The sharpness metric categories can include pixel intensity-based metrics, gradient-based metrics, transform-based metrics, and perceptual-based metrics, or any combination thereof. The feature extractor 206 can use multiple sharpness metrics from each of the categories. For example, the feature extractor 206 can use a total of 13 sharpness metrics: 5 pixel intensity-based metrics, 3 gradient-based metrics, 3 transform-based metrics, and 2 perceptual-based metrics.

In some implementations, the sharpness metrics can include the pixel intensity-based metric: variance metric; the intensity-based metrics: range histogram metric, entropy histogram metric, Mason and Green's histogram metric, Mendelsohn and Mayall's histogram metric; the gradient-based metrics: gradient metric, sum of modified laplacian metric, Tenengrad metric; the transform-based metrics: blur metric in the frequency domain, DCT blur metric, Haar wavelet transform metric; the perceptual-based metrics: Marziliano metric, cumulative probability of blur detection metric; or any combination thereof.

In some implementations, the feature extractor 206 can generate between about 1 and about 30 feature values, between about 1 and about 20 feature values, between about 1 and about 15 feature values, between about 1 and about 10 feature values, between about 1 and about 7 feature values, or between about 1 and about 5 feature values for each patch 214.

The blur detector 120 can include a patch classifier 208. The patch classifier 208 can be any script, file, program, application, set of instructions, or computer-executable code, that is configured to enable a computing device on which the patch classifier 208 is executed to determine blur scores for the patches 214 and generate blur maps 216.

The patch classifier 208 can classify each of the patches 214 as blurry or non-blurry. The patch classifier 208 can generate a blur score that indicates the level of blur in each of the patches 214. The patch classifier 208 can classify the patches 214 as blurry or non-blurry and generate the blur score based on the above-described feature values generated by the feature extractor 206. The patch classifier 208 can use a random forest regression algorithm, a logistic regression algorithm, or a residual neural network to generate a blur score for each of the patches 214.

In some implementations, the random forest can include between about 10 and about 1,500 trees, between about 100 and about 1,300 trees, between about 300 and about 1300 trees, between about 700 and about 1,200 trees, or between about 900 and about 1,100 trees. The prediction error variability for the random forest can be estimated by repeating a cross-validation (CV) analysis multiple times. During each of the CV tests, a different one of the images 212 can be excluded.

In some implementations, the patch classifier 208 can include a residual neural network. The neural network can be between about 10 and about 20 layers deep, about 15 and about 20 layers deep, or between about 18 and about 20 layers deep. In some implementations, the neural network can accept color or grayscale images 212.

The patch classifier 208 can, for example using the random forest or neural network, generate a blur score for each of the patches 214. The patch classifier 208 can generate the blur score based on each of the feature values that are generated by the feature extractor 206. The blur score can indicate a level of blur present in each of the patches 214.

The patch classifier 208 can generate a blur map based on the blur scores for each of the patches 214. In some implementations, the patch classifier 208 can apply a threshold to the blur score of each patch 214. If the blur score is above the threshold, the patch 214 can be flagged, tagged, labeled, or otherwise identified or indicated as containing blur. If the blur score is below the threshold, the patch 214 can be flagged, tagged, labeled, or otherwise identified, or indicated as not containing blur.

The patch classifier 208 can generate blur scores for each of the patches 214 from an image 212. The patch classifier 208 can generate the blur map 216 from the blur scores. The blur map 216 can be a standalone image. In some implementations, the blur map 216 can be overlaid onto the image 212. The blur map 216 can indicate which regions of the image 212 include blur. The regions including the blur may not be suitable for further automated or human analysis.

In some implementations, the patch classifier 208 can generate a blur score of the entire image 212 based on the blur scores for each of the patches 214 that make up the image 212. If the blur score for the image 212 is below a predetermined threshold, the image 212 can be discarded. The blur score for the entire image 212 can be generated by averaging the blur score for each of the patches 214. In some implementations, patches 214 containing substantially only background image data can be excluded from the calculation to generate an average blur score for the entire image 212. In some implementations, a weighted average can be used to generate the blur score for the entire image 212. The weighted average can weight patches 214 near the middle of the image 212 more heavily than patches 214 near the periphery of the image 212. In some implementations, the blur score for the entire image 212 can be the mode of the patches' blur scores (e.g., which blur score occurred the most often). The blur score for the entire image 212 can be binary—indicating whether the image 212 is blurry or not blurry. The binary blur score for the entire image 212 can be generated by determining the number of patches that have a blur score above a predetermined threshold. If the number of patches 214 with a blur score above the threshold is greater than a majority of the patches 214, the patch classifier 208 can classify the entire image 212 as being blurry (e.g., having a binary yes for the blur score). In some implementations, the entire image 212 can be marked as blurry if more than 20%, more than 30%, more than 40%, more than 50%, more than 60%, or more than 70% of the patches 214 have a blur score above the predetermined threshold. In some implementations, when the blur score for the entire image 212 is above the predetermined threshold or when the binary blur score indicates that the image 212 is blurry, the patch classifier 208 can generate a notification that the pathology slide 218 from which the image 212 was generated should be rescanned. In some implementations, the blur detector 120 can be a quality control component of the scanner 220, and the patch classifier 208 can cause the scanner 220 to automatically rescan the pathology slide 218.

In some implementations, the patch classifier 208 can be trained with a plurality of input images 212 that are generated to include a predetermined amount of blur. For example, a training data set can be generated from images 212 that substantially do not include blur. A Gaussian (or other) blur filter can be applied to different portions of the originally-sharp, input images 212. The different portions of the input images 212 that are blurred can be varied in size, location, and amount of blur. The location and amount of blur applied to the portions can be recorded to be used in the training process. Generation of the training data set and training the model is also discussed further in the Examples section.

The blur detector 120 can include a database 210. The database 210 can be any type of computer-readable storage device. The storage device can include magnetic-based drives, optical-based drives, or solid-state drives. The blur detector 120 can store the images 212, patches 214, and blur maps 216 in the database 210.

Figure 3:
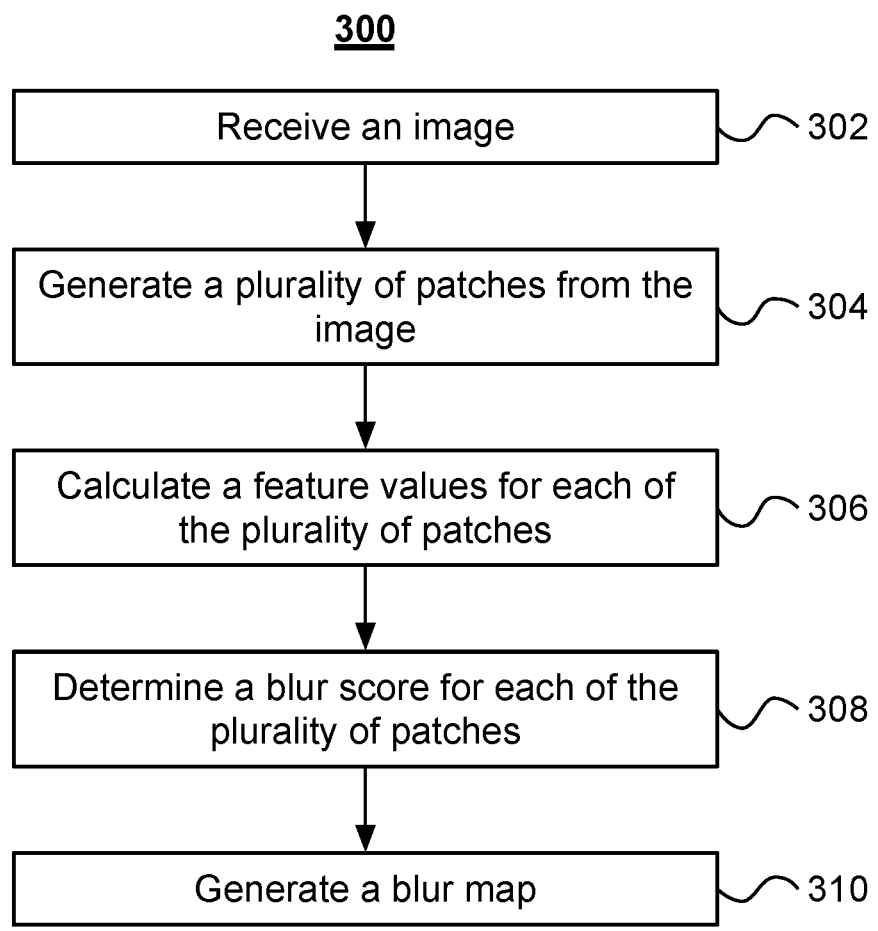
FIG. 3 illustrates a block diagram of an example method to detect a quantity of blur in images.

FIG. 3 illustrates a block diagram of an example method 300 to detect a quantity of blur in images. The method 300 can include receiving an image (BLOCK 302). The method 300 can include generating a plurality of patches from the image (BLOCK 304). The method 300 can include calculating feature values for each of the patches (BLOCK 306). The method 300 can include determining a blur score for each of the patches (BLOCK 308). The method 300 can include generating a blur map (BLOCK 310).

As set forth above, the method 300 can include receiving an image (BLOCK 302). The image 212 can be a digitized image of a pathology slide 218. The pathology slide 218 can be digitized by a scanner 220. The blur detector 120 that performs at least portions of the method 300 can be a component of the scanner 220 or can be a component of a separate device. In some implementations, the blur detector can convert the image 212 into a grayscale image. In some implementations, the blur detector generates multiple images from the input image 212. The multiple images can include different portions of the image spectrum. For example, the input image 212 can be divided into three images with the first containing the red components, the second containing the green components, and the third containing the blue components. In some implementations, the blur detector can perform other image preprocessing. For example, the blur detector may remove background portions of the image 212, remove noise from the image 212, or may normalize the image's 212 color histogram.

Figure 4A:
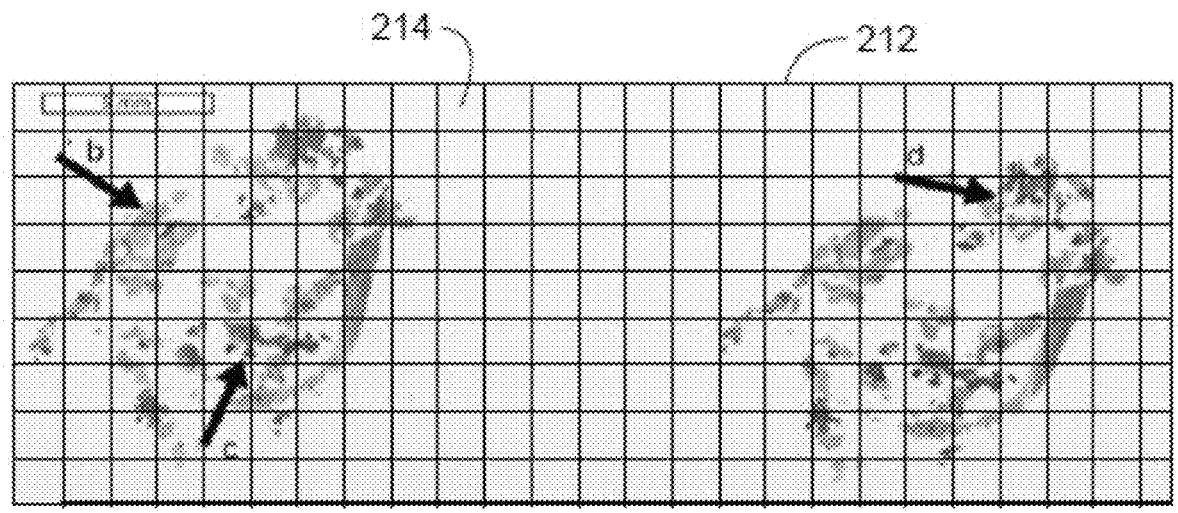
FIG. 4A illustrates a pathology image and the plurality of patches generates from the image.
Figures 4B, 4C, 4D:
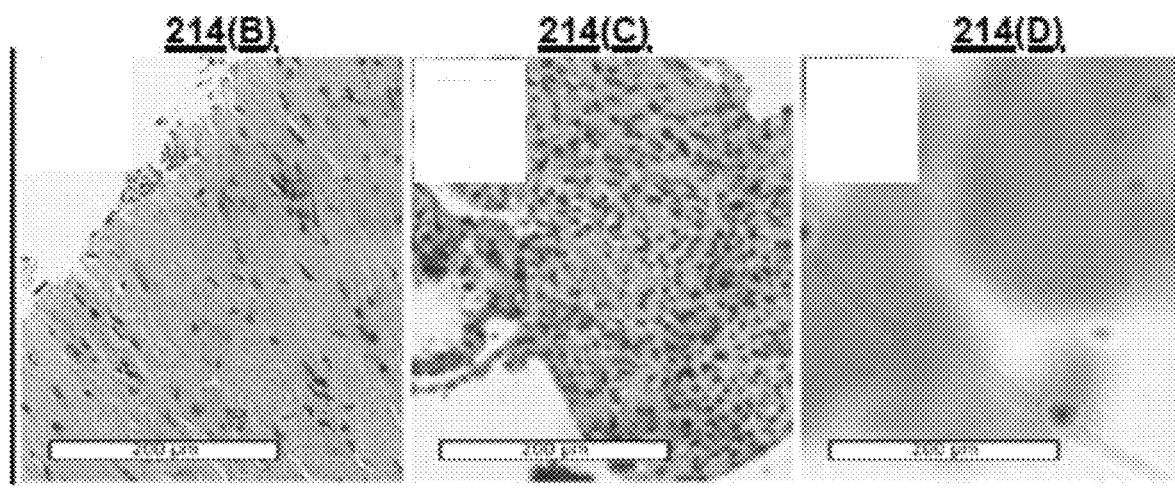
FIGS. 4B-4D illustrate enlarged views of patches from the image illustrated in FIG. 4A.

The method 300 can include generating a plurality of patches from the received image (BLOCK 304). Also referring to FIG. 2 and FIGS. 4A-4D, the patch generator 202 can divide the image 212 into a plurality of patches 214. The patches 214 include a plurality of pixels. In some implementations, the patches 214 are generated in a grid-fashion as illustrated in FIG. 4A. In these implementations, the patches 214 do not overlay one another. In other implementations, the patch generator 202 can generate the patches 214 with a sliding window such that a patch 214 can overlay one or more of neighboring patches 214. FIGS. 4B-4D illustrate enlarged views of patches 214(b)-214(d) from the image 212 illustrated in FIG. 4A. As illustrated, the patches 214(b)-214(d) have different levels of blur. The patch 214(b) is sharp and substantially lacks blur, the patch 214(c) includes a moderate amount of blur, and the patch 214(d) includes a relatively high degree of blur.

Referring to FIG. 3, the method 300 can include calculating feature values for each of the plurality of patches (BLOCK 306). A plurality of sharpness metrics can be applied to each of the patches 214. For each patch 214, the feature extractor 206 can generate different feature values based on the different sharpness metrics. The feature extractor 206 can generate different feature values using a sharpness metric from different sharpness categories, such as pixel intensity-based features, gradient-based features, transform-based features, or perceptual-based features. The sharpness metrics can include a variance metric, a range histogram metric, an entropy histogram metric, a Mason and Green's histogram metric, a Mendelsohn and Mayall's histogram metric, a gradient metric, a sum of modified laplacian metric, a Tenengrad metric, a blur metric in the frequency domain, a DCT blur metric, a Haar wavelet transform metric, a Marziliano metric, or a cumulative probability of blur detection metric.

The method 300 can include determining a blur score for each of the patches (BLOCK 308). The patch classifier 208 can generate the blur score for each of the patches 214 based on the feature values that the feature extractor 206 calculates for each of the respective patches 214. The patch classifier 208 can use the feature values as inputs in determining the blur score. The patch classifier 208 can use the feature values as inputs to a random forest classifier or a neural network classifier. The neural network classifier can be a residual neural network. In some implementations, the blur scores for each of the image's patches 214 can be normalized—for example, between 0 and 1, with the blurriest patch 214 being normalized to 1 and the sharpest patch 214 being normalized to 0.

In some implementations, the blur score for each patch 214 can be converted to a binary result—blurry or not blurry. Each patch's blur score can be compared against a predetermined threshold. The patches 214 having a blur score above the predetermined threshold can be flagged as blurry and the patches 214 having a blur score below the predetermined threshold can be flagged as not blurry.

The method 300 can include generating a blur map (BLOCK 310). The blur map can be based on the blur score for each of the patches 214. The blur map can assign a parameter value to each region of the blur map based on the blur score from the patch 214 generated from the respective region. The parameter value can be between a first and second threshold value. For example, the blur map's parameter values can be normalized between 0 and 255 for a grayscale image. In some implementations, the parameter value can be set to a first threshold value (e.g., 0) or a second threshold value (e.g., 1) based on whether the blur score for the respective patch 214 is above or below a predetermined threshold.

Also referring to FIGS. 5A-5F, FIG. 5A illustrates an image 212. FIG. 5B illustrates a blur map 500 for the image 212 illustrated in FIG. 5A. FIGS. 5C-5F illustrate enlarged patches 214 generated from the image 212 illustrated in FIG. 5A. FIG. 5C illustrates a patch 214 that includes a relatively sharp region of the image 212 illustrated in FIG. 5A. The patch 214 illustrated in FIG. 5C is taken from region A. FIGS. 5D and 5E are taken from regions B and C of the image 212 illustrated in FIG. 5A. Both the patches 214 include a relatively high level of blur. FIG. 5F is taken from region D of the image 212 illustrated in FIG. 5A. The patch 214 includes a mixture of blurry and non-blurry regions.

For the blur map 500 illustrated in FIG. 5B, the patch classifier 208 compared each patch's blur score to a threshold. The blur scores above the threshold were assigned a relative blur score of 1 and appear as shaded regions 502 on the blur map 500. The blur score below the threshold were assigned a relative blur score of 0 and appear as clear regions 504 on the blur map 500.

Figure 6:
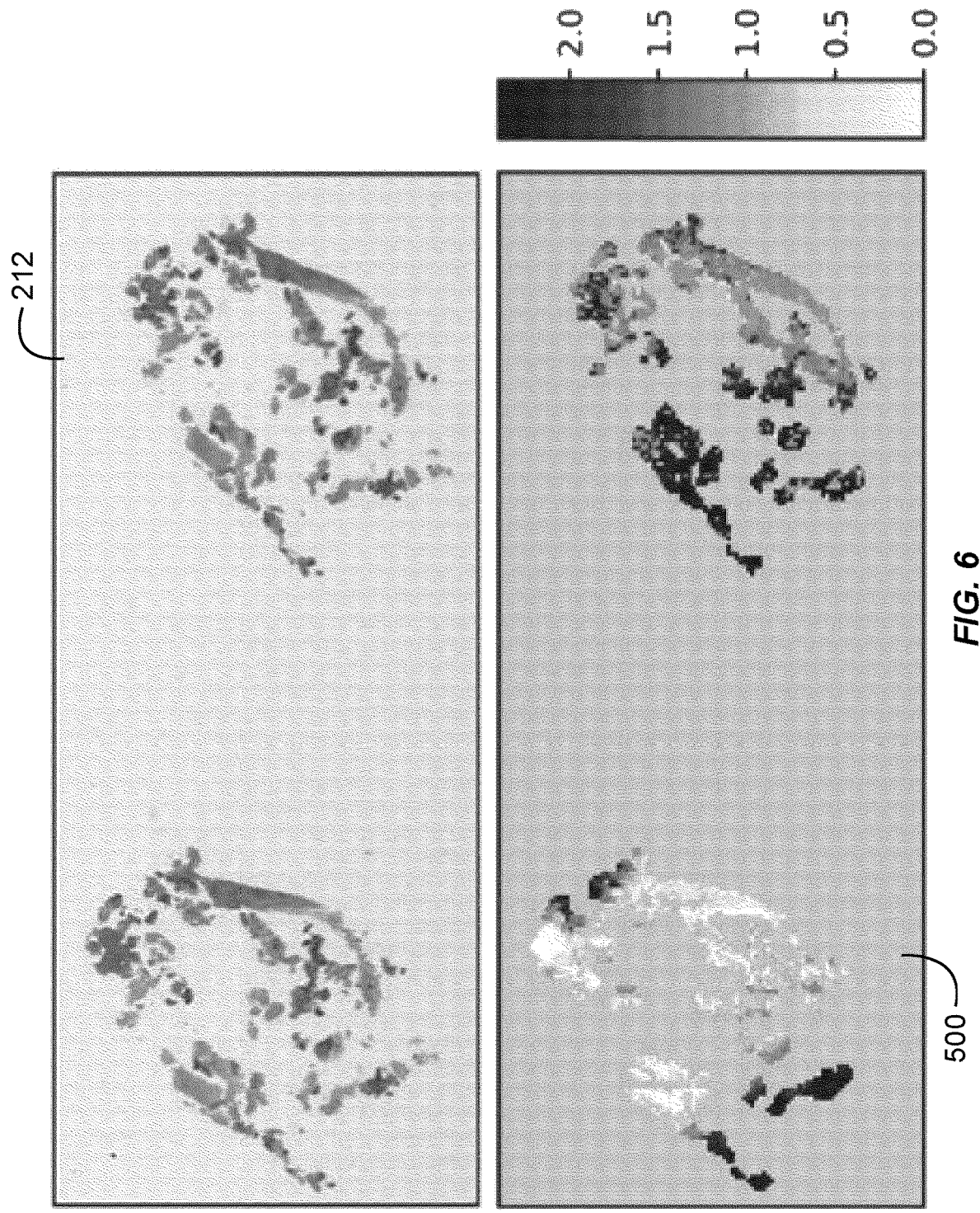
FIG. 6 illustrates a blur map where the parameter values for each of the regions are scaled between a first and second threshold value.

FIG. 6 illustrates a blur map 500 where the parameter values for each of the regions are scaled between a first and second threshold value. The parameter values are scaled between a first threshold value (e.g., 0) and a second threshold value (e.g., 2.5). The first threshold parameter value can correspond to the sharpest regions in the blur map 500 and the second threshold parameter value can correspond to the blurriest regions in the blur map 500.

The blur detector 120 can be used to detect and quantify blur in any type of digital image. For example, the blur detector 120 can detect and quantify blur in satellite images. The satellite images can include blur that is induced by the change in topography of the imaged area. The blur detector can detect which regions of the satellite image are blurry because of the changes in terrain, mis-focusing of the satellite's cameras, artifacts in the image, or other causes of blur in the image. In another example, the blur detector 120 can detect blur in images used for facial recognition. The blur detector 120 can detect and classify an image as blurry and cause the facial recognition system to re-take an image of the person's face.

The blur detector 120 can also be used in other systems that automatically identify and classify objects within digital images. The blur maps generated by the blur detector 120 can be used by the identification and classification systems to indicate which regions of the input images should be ignored (or otherwise reduced in importance) when performing identification and classification tasks.

EXAMPLES

The below examples describe examples of using the system described herein to generate blur maps for input images. The examples were conducted with a system similar to the system 200, illustrated in FIG. 2.

To test the system, data sets were first generated that included a tailored level of sharpness for quantification. The data sets were generated from 30 tissue microarray (TMA) spots from clear cell renal cell carcinoma (kidney cancer) patients, and 159 whole slide images (WSIs) of prostate cancer. The prostate and kidney slides were scanned on an Aperio AT2 whole slide scanner (Leica Biosystems), whereas hippocampus slides were scanned on a Nanozoomer C9600 virtual slide light microscope scanner (HA-MAMATSU). All slides were subsequently anonymized to protect patient privacy. To guarantee broad applicability of the final prediction models not only in terms of instrumentation (e.g. using different scanners), the three sets were processed with different immunohistochemical staining. The prostate slides were stained with H&E, the hippocampus slides with SDF-1, and the kidney slides with TOM20. All the slides were manually inspected to be completely free of blurred regions.

Squared grayscaled patches 214 of 64, 128, 256 and 512 pixels (without overlap) were extracted from the slides. The kidney samples originating from TMAs included wide areas of white background. Therefore, a thresholding approach (t=230 on grayscaled patches 214) was used to exclude patches 214 with too much background data. The data set include artificially blurred patches 214 that were generated using a Gaussian filter simulating out of focus blur. By increasing the standard deviation parameter of the Gaussian filter, increasing levels of blurriness were obtained. The level of blur for each slide was also scored from 0 to 5 by a human grader.

The patch classifier 208 generated feature values for each of the patches 214. The blur score was generated for each patch 214 with a random forest that included 1,000 trees trained with 13, 10, and 6 feature values. In another test, the patch classifier 208 generates the feature values using a residual neural network that included 18 layers of neurons. Training for the neural network was performed in parallel on four Nvidia TitanX GPUs for 300 epochs with hyperparameters set as follows: batch size=1024, learning rate=0.1 (multiplied by 1/10 every 30 epochs), momentum=0.1. For each epoch, the training was done on the training set and validation error calculated for the validation set. After 300 epochs, the best performing model on the validation set was chosen.

Figure 7:
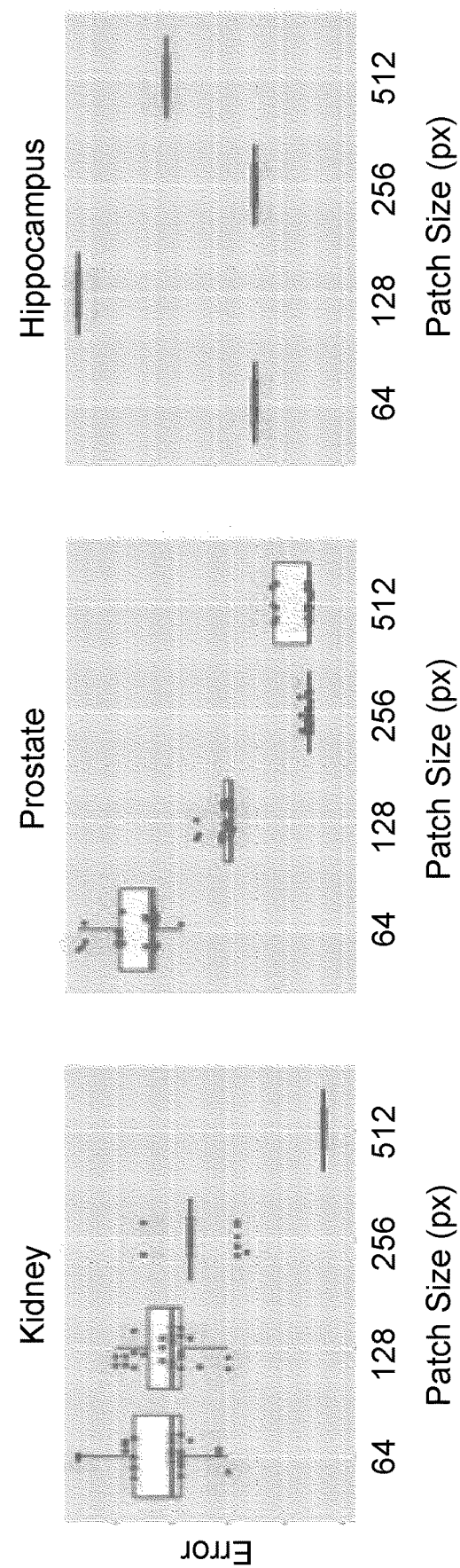
FIG. 7 illustrates, for each of the tissue data sets, the relationship between patch size and error rate.

In one implementation, the patch classifier 208 was trained on the tissue types separately. The patch classifier 208 was trained on kidney, prostate, and hippocampus images 212. Then classification experiments were performed on single tissue data sets (e.g. prostate, hippocampus, and kidney data sets). The blur detection was highly accurate for all data sets with errors of 2%, 1.5%, and 0.3% for prostate, kidney, and hippocampus data sets, respectively, for patches 214 of 64×64 pixels. The error was 0.5%, 0.2%, and 0.5% for patches 214 of 512×512 pixels. It was observed that the size of the patches 214 can influence accuracy with blur detection on bigger patches 214 being more accurate than on smaller patches 214 as it can be seen in FIG. 7. FIG. 7 illustrates, for each of the tissue data sets the relationship between patch size and error rate.

Figure 8:
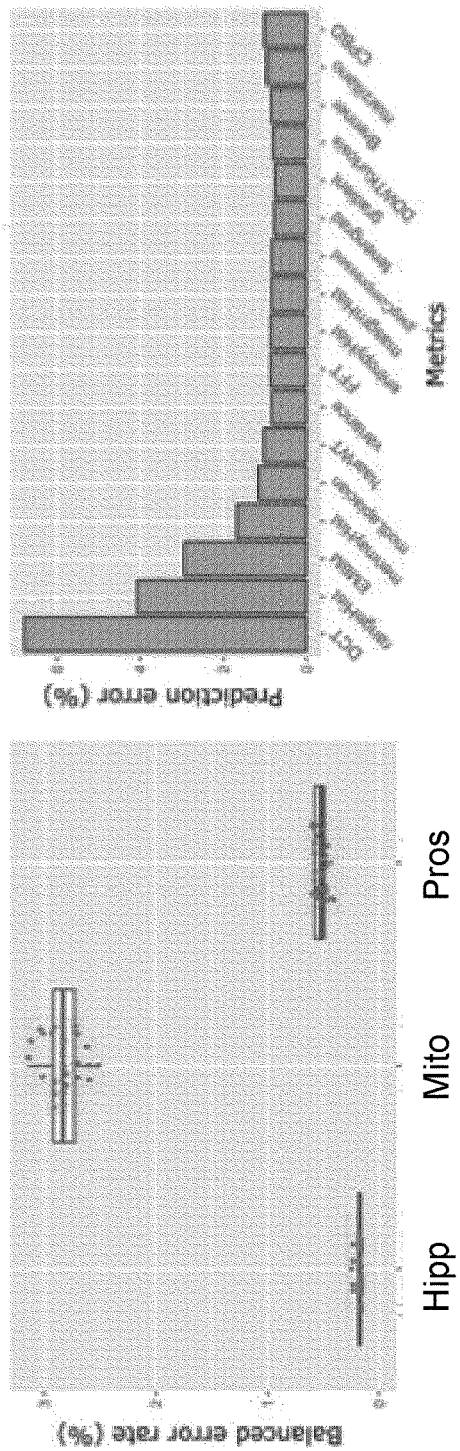
FIG. 8 illustrates a plot of the prediction error variability separated by tissue type.

The feature importance analysis determined that, in the case of intra-set tasks, only 2 or 3 metrics would be enough to reach minimum prediction error, with perceptual metrics and cosine transform metric being the most important. Going one step further, all data sets were combined to allow for a more general classifier able to predict blurriness independently from the tissue type, at least within the tissues in our data set. Kidney samples with mitochondria staining were harder to predict with an error of around 3% mostly due to false positives (sharp patches 214 that were predicted blurred), while prostate and hippocampus had instead errors of 0.5% and 0.2% respectively, as shown in FIG. 8. The feature importance analysis highlighted how, in this case, more metrics can be used to discern blurriness when image content has higher variance.

Figure 9:
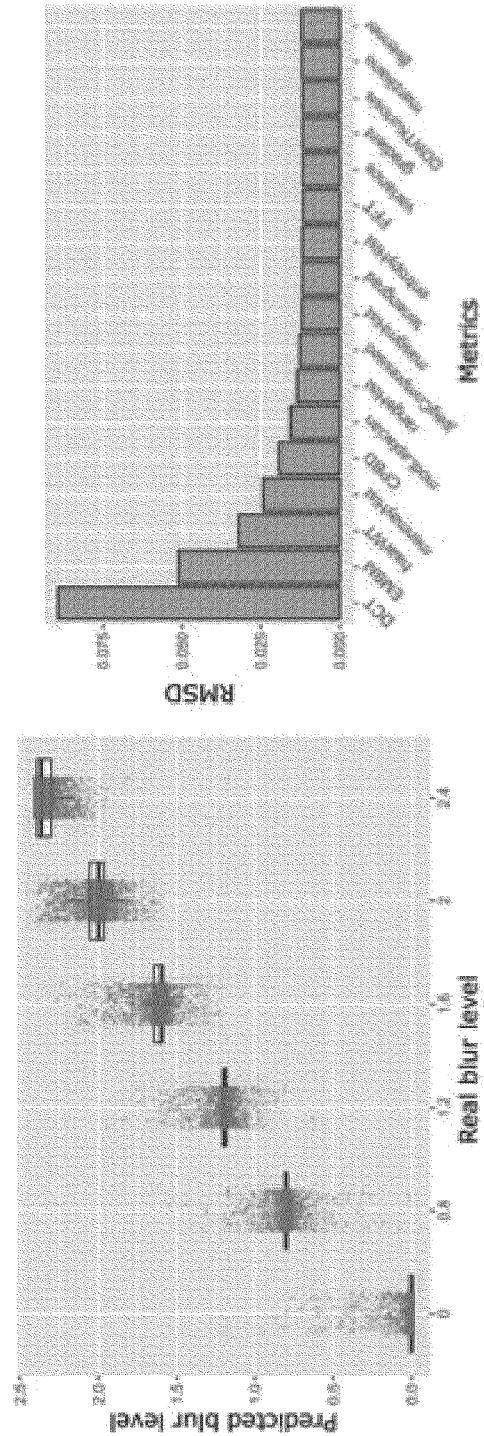
FIG. 9 illustrates a plot comparing predicted and real blur levels.

A regressor was then trained on all 3 data sets to also predict the level of blurriness of the patches 214. The results included a RMSD close to 0.012 and a Spearman correlation coefficient larger than 0.98. As illustrated in FIG. 9, the dispersion of the predictions is shown and a very flat distribution centered around the expected values can be observed, underlying the accuracy of the regression. The feature selection was performed minimizing the mean squared error (MSE) and it was in accord with the results of the classification task. The bar chart illustrated in FIG. 9 illustrates how the metrics affect the classification.

The classification experiments were also performed where the patch classifier 208 used a neural network. The residual neural network (ResNet) converged to 0.03% error on the validation set after approximately 50 epochs. The best model showed 99.95% accuracy on the test set across all classes. The result was comparable to the random forest approach, which achieved an accuracy of 99.39%. The logistic regression showed an accuracy of 94%, pointing to the fact that the non-linearity introduced by the random forest or the neural network, can be important for this task. In addition, by using a reduced set of features only about 0.29% 0.66% accuracy for logistic regression and random forest, respectively, was lost. For mixed data sets, the validation error converged to 0.29% after roughly 100 epochs. For the mixed data sets, the accuracy was about 99.74%, outperforming the random forest approach with an accuracy 97.43%. The logistic regression had an accuracy of 87%. Using the reduced set of features, the accuracy drops by 4.18% and 1.08% for the logistic regression and random forest, respectively. A summary of these results is also presented in the below table.

| Data Set | Logistic Regression | | Random Forest | | |
|---|---|---|---|---|---|
| | All | Reduced | All | Reduced | ResNet |
| Prostate | 94.26 | 93.97 | 99.41 | 98.75 | 99.95 |
| Mixed | 87.25 | 83.07 | 97.43 | 96.34 | 99.74 |

Figure 10:
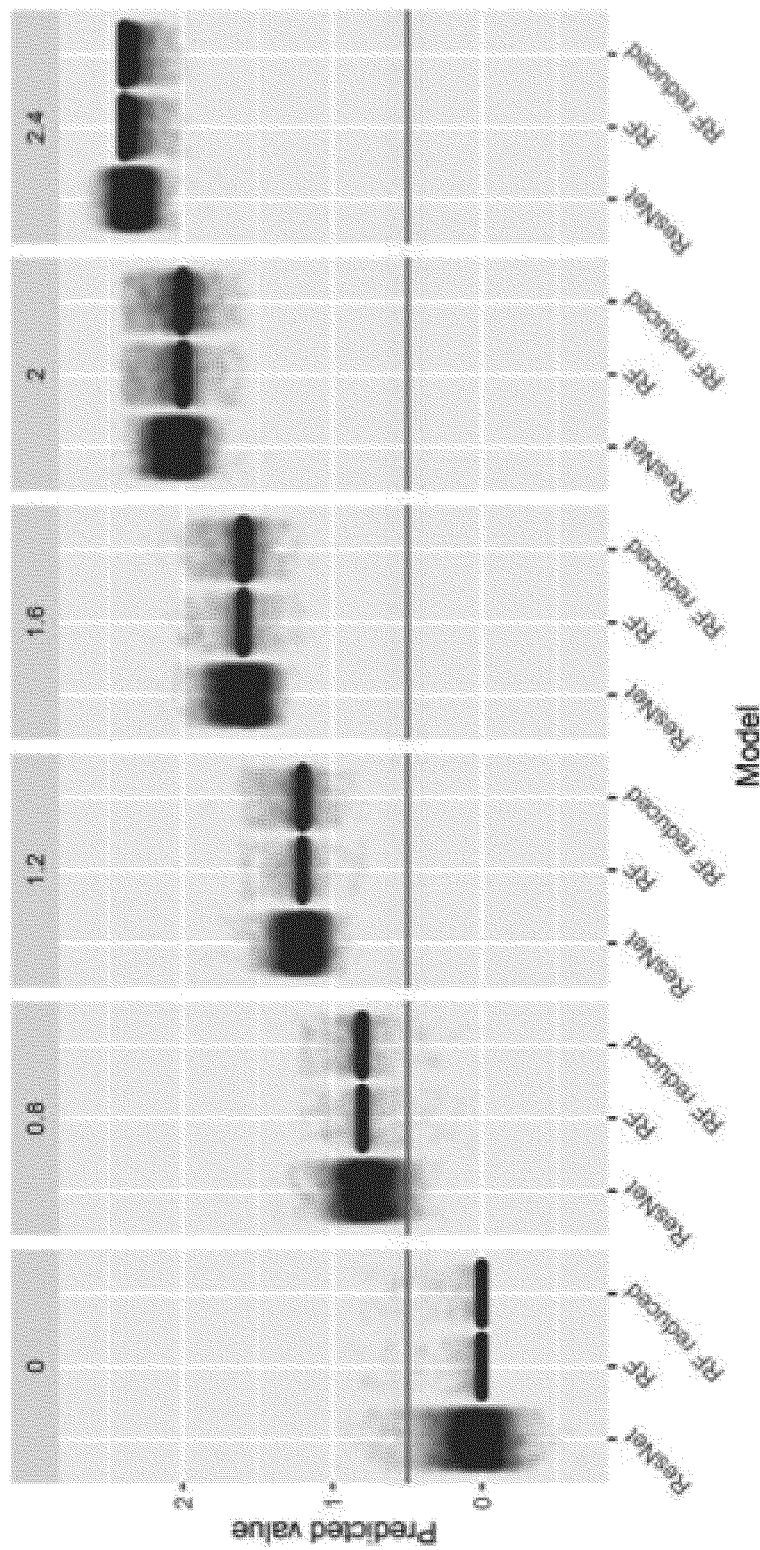
FIG. 10 illustrates the determined blur score for a plurality of data sets.

The system described herein can also be used to determine the level of blur present in an image 212. FIG. 10 illustrates the determined blur score for a plurality of data sets. The data sets included a Gaussian blur of 0, 0.8, 1.2, 1.6, 2, and 2.4. The blur was detected with a ResNet classifier, a random forest classifier, and a random forest classifier using a reduced set of input sharpness metrics. As illustrated in FIG. 10, all the models were able to discern the different levels of blur with fair accuracy. The ResNet converged after roughly 30 epochs. Prediction on the test set using the best model gave an MSE of 0.018, whereas the two random forest approaches resulted in a MSE of 0.004 and 0.005 when using all features or a reduced set, respectively.

C. Systems and Method to Determine Slide Saliency

Most digital slides are annotated (or otherwise classified) at the whole slide level and not at the image (or sub-slide) level. The manual labeling of the images is prohibitive, requiring pathologists with decades of training and outstanding clinical service responsibilities. The present solution can generate annotations in a nonintrusive manner during a pathologist's routine clinical work. The solution can, after routine scanning of the whole slide, register the video frames of the pathologist's field of view to a digital version of the slide. The solution can detect the motion of the pathologist's view and measure the observing (or dwell) time to generate a spatial and temporal saliency heat map of the whole slide. The annotated slides and heat maps can be used to train a neural network to annotate and identify regions of important in future input slides. The solution also includes a convolutional neural network that detects diagnosis-relevant salient regions for new input slides and identifies the salient regions of the input slide.

Figure 11:
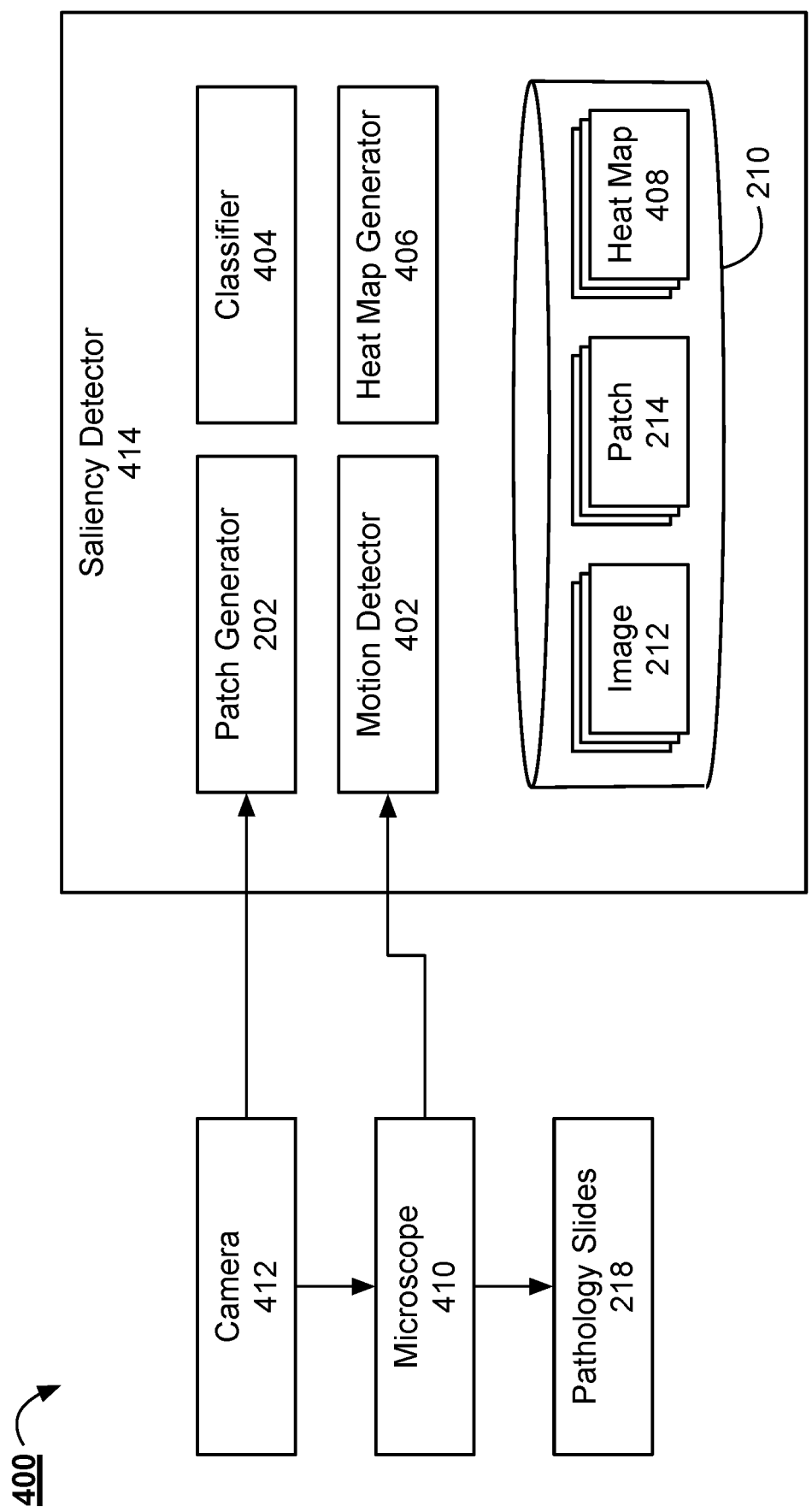
FIG. 11 illustrates a system to detect the saliency of images.

FIG. 11 illustrates a system 400 to detect the saliency of images. The system 400 includes a saliency detector 414. The saliency detector 414 and the blur detector 120 can be part of the same device or different devices. The saliency detector 414 can include a patch generator 202. The saliency detector 414 can include a motion detector 402 and a classifier 404. The saliency detector 414 can include a heat map generator 406 that generates the heat maps 408. The system 400 can include a microscope 410 that views pathology slides 218. Via the microscope 410, a camera 412 captures the images 212 of the pathology slide 218. The saliency detector 414 can receive the images 212 from the camera 412 and store the images 212 in the database 210.

The system 400 can include a camera 412. The camera 412 can be a video camera or a still camera. The camera 412 can be a Panasonic Lumix DMC-FH10 camera with a 16.1 megapixel charge-coupled device ("CCD"), capable of 720p motion JPEG video at 30 frames per second. The camera 412 can be mounted on a second head of the microscope 410. The microscope 410 can have an objective lens magnification of 4×, 10×, 20×, 40×, and 100×. The microscope 410 can have a magnification of 10×. The system 400 can include an additional camera 412 that can be a scanner 220 that creates a digital image of the slide. As described below, the video stream generated by the camera 412 can be registered with the digital image of the slide.

The saliency detector 414 can include a patch generator 202. As described above, the patch generator 202 can generate a plurality of patches 214 from the images 212 that the saliency detector 414 receives. The patch generator 202 can store the patches 214 into the database 210. The patches 214 can overlap neighboring patches 214 by between about 0% and about 80%, between about 0% and about 60%, or between about 0% and about 40%.

The motion detector 402 can detect movement of the pathology slides 218 along the microscope's stage to determine which portion of the pathology slide 218 (and which patch 214) the viewer is viewing. In some implementations, the movement can be detected directly by the movement of the microscope stage.

In some implementations, the motion detector 402 can use computer vision to detect movement between frames of the video stream received from the camera 412. For example, the motion detector 402 can detect the movement with OpenCV. In some implementations, the motion detector 402 determines a relative motion. In other implementations, the pathology slide's initial position can be registered with the motion detector 402 to enable the motion detector 402 to determine the absolute motion of the pathology slide 218.

The motion detector 402, running a computer vision script or library (e.g., OpenCV) can calculate a rigid body transformation between the interest points in a video frame and a patch 214 in order to calculate the distance in pixels that the video frame can be off-center from the patch 214. The least off-center patch 214 can be selected as the best registration because the pathologist's field of view ("FOV") can be in approximately the same place in this video frame and patch 214.

During inspection of the pathology slide 218 by a pathologist, the pathologist can switch the objective lens magnification. The motion detector 402 can detect the lens change automatically when the field of view bounding box of nonblack pixels changes size. The motion detector 402 can also detect a switch in the object lens magnification by detecting a change in the pixel density of the image 212 (or portion thereof) analyzed by the motion detector 402.

As the pathologist examines the pathology slide 218, the pathologist can move the pathology slide 218 around the stage of the microscope 410 and view different regions of the pathology slide 218. Based on the movement of the pathology slide 218, the motion detector 402 can determine which of the patches 214 corresponding to the image 212 of the pathology slide 218, the pathologist is viewing. The motion detector 402 can maintain a data matrix that includes a location corresponding to each of the patches 214 in the image 212. The motion detector 402 can measure the amount of time the pathologist dwells (or views) a region of the pathology slide 218 that corresponds to one of the patches 214 (or a subregion of the patches 214). At each patch 214 location in the data matrix, the motion detector 402 can store the total time that the pathologist viewed the respective patch 214.

Figure 12:
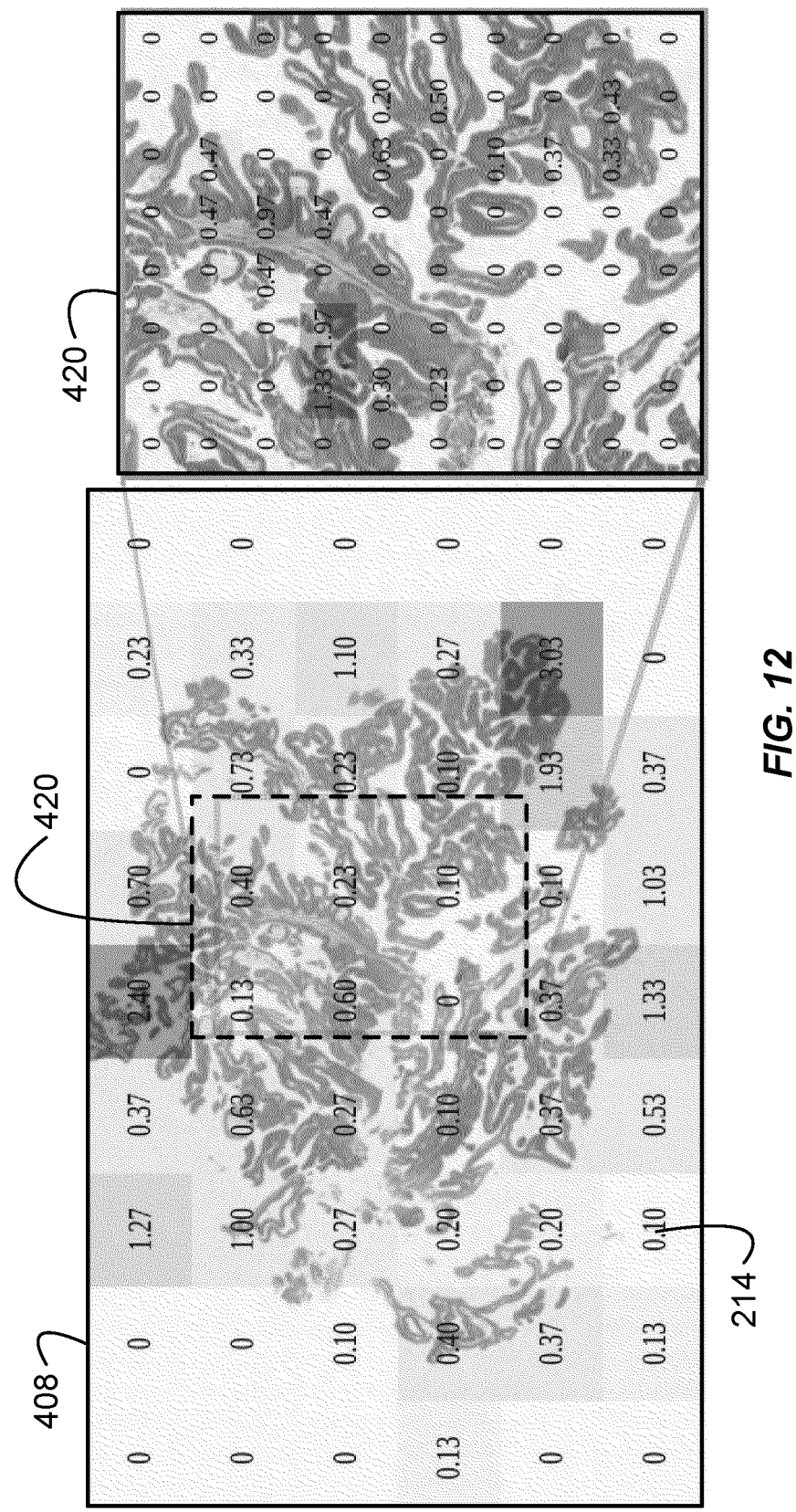
FIG. 12 illustrates an example heat map generated using the system illustrated in FIG. 11.

The saliency detector 414 can include a heat map generator 406. The heat map generator 406 can generate heat maps 408 based on the amount of time the motion detector 402 determines the pathologist viewed each of the patches 214 of an image 212. FIG. 12 illustrates an example heat map 408. The heat map 408 is divided along the plurality of patches 214. In other implementations, the heat map 408 can be delineated along borders other than the patches 214, such as subpatches smaller than the patches 214. The heat map 408 can be divided into regions smaller or larger than the patches 214. The heat map 408 can be overlaid on the image 212 for which the heat map 408 was generated. Each region (or patch 214) can indicate the amount time the pathologist viewed the region. The amount of time can be indicated with a numerical value that indicates the time in seconds or by a color coding scheme.

As discussed above, the regions can be divided into regions smaller than the patches 214. FIG. 12 illustrates a region 420 that was subdivided into subpatches. The patch generator 202 can generate subpatches for each of the patches 214. The subpatches can be generated when the pathologist zooms into a patch 214 to view the patch 214 at a higher resolution.

The saliency detector 414 can include a classifier 404. The classifier 404 can, based on a comparison of the heat maps 408 to the images 212, determine which regions (or patches 214) of the images 212 are salient or otherwise relatively more important when classifying and annotating the pathology slides 218.

The classifier 404 can include a deep learning model to determine a binary classification of the patches 214 as salient or non-salient. The classifier 404 can use 800×800 pixel patches 214 as input. The patches 214 can be labeled with the corresponding viewing (or dwell) time as determined by the motion detector 402. The classifier 404 can be a neural network. The weights of the top layer of the neural network can be re-initialized after) pre-training. Two output neurons can be connected to the re-initialized, top layer. The classifier 404 can be trained on 800×800 pixel patches 214 for 10,000 iterations.

In some implementations, the classifier 404 can determine if each of the respective patches 214 are salient. The classifier 404 can generate a binary, yes or no, for each of the patches 214. In some implementations, the classifier 404 can predict a time that a pathologist would dwell on each of the input patches 214 and then determine a saliency score. The saliency score of each patches 214 can be a function of the predicted dwell time. In some implementations, the classifier 404 can predict a dwell time that the classifier 404 can compare to a predetermined threshold. If the dwell time for a respective patch 214 is above the predetermined threshold, the patch 214 can marked as a salient patch. If the predicted dwell time is less than the predetermined threshold, the patch 214 can be marked as not salient. In some implementations, the predetermined threshold can be between about 0.1 and about 0.5 seconds or between about 0.1 and about 0.25 seconds. In some implementations, the classifier 404 can generate annotations for each of the regions based on the saliency score for the regions of the slide.

Figure 13:
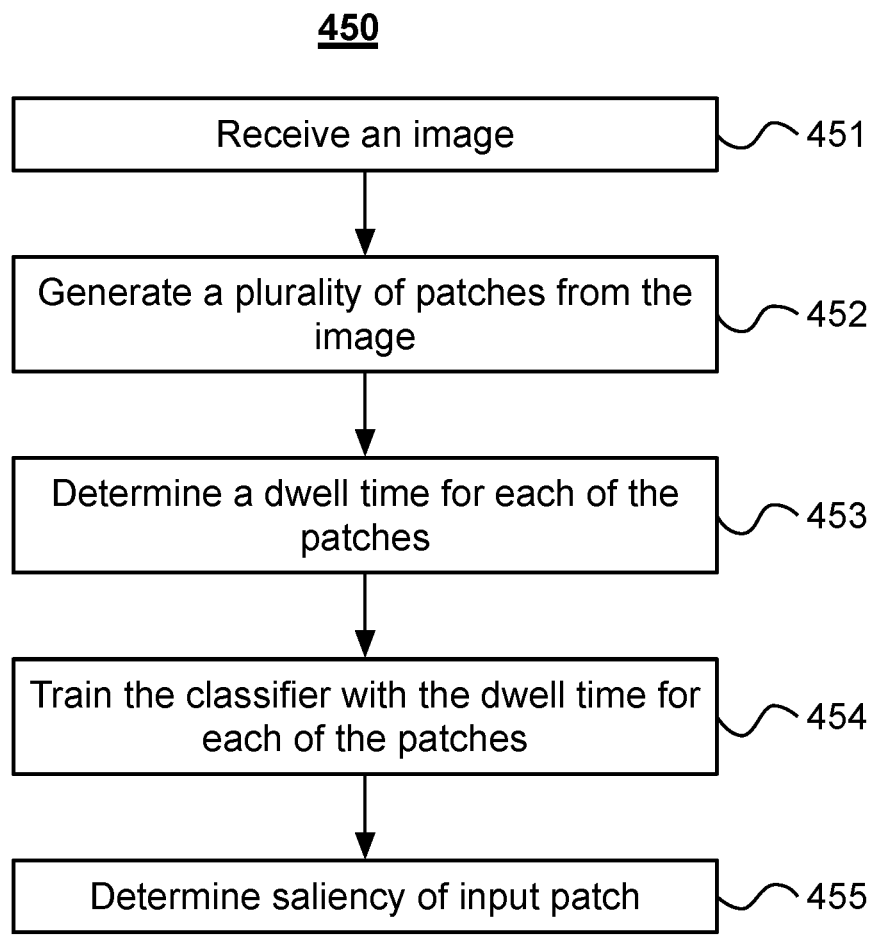
FIG. 13 illustrates a block diagram of an example method for determining the saliency of an input patch.

FIG. 13 illustrates a block diagram of an example method 450 for determining the saliency of an input patch. The method 450 can include receiving an image (BLOCK 451). The method 450 can include generating a plurality of patches from the image (BLOCK 452). The method 450 can include determining a dwell time for each of the patches (BLOCK 453). The method 450 can include training a classifier based on the dwell times (BLOCK 454). The method 450 can include determining the saliency of an input patch (BLOCK 455).

As set forth above, the method 450 can include receiving an image (BLOCK 451). The image 212 can be digitized image of a pathology slide 218. The pathology slide 218 can be digitized via a camera that captures a pathologist's view of the pathology slide 218 through a microscope 410. The received image 212 can be a plurality of images, such as a video stream. In some implementations, the saliency detector 414 can receive an image 212 of substantially the whole pathology slide 218 and a video stream of the pathologist's view through of the pathology slide 218 through the microscope 410.

The method 300 can include generating a plurality of patches 214 from the received image (BLOCK 452). The patches 214 include a plurality of pixels. In some implementations, the patches 214 are generated in a grid-fashion. In these implementations, the patches 214 do not overlay one another. In other implementations, the patch generator 202 can generate the patches 214 with a sliding window such that a patch 214 can overlay one or more of neighboring patches 214.

The method 450 can include determining a dwell time for each of the patches (BLOCK 453). The motion detector 402 can receive an image 212 of the pathology slide 218, which the patch generator 202 can generate into a plurality of patches 214. The motion detector 402 can also receive a video stream from the camera 412 that captures the pathologist's view through the microscope 410. The motion detector 402 can determine which the patches 214 the pathologist is viewing in the image 212 of the pathology slide 218 by registering the motion detected in the video stream to the image 212 of the pathology slide 218. The motion detector 402 can calculate the dwell time by activating a different running timer for each of the patches 214 when the pathologist views the respective patch 214. In some implementations, the motion detector 402 can know the frame rate of the input video stream from the camera 412 and can calculate the dwell time by counting the number of frames that includes each of the respective patches 214.

The method 450 can include training the classifier with the dwell times for each of the patches (BLOCK 454). The classifier 404 can receive the dwell times and associated patch 214. The classifier 404 can include neural network classifier. Through the training process, the classifier 404 can learn to generate a predicted dwell given the image data in an input patch.

The method 450 can include determining the saliency of an input patch (BLOCK 455). Once trained, the classifier 404 can generate a dwell time based on the image data in an input patch. The classifier 404 can convert the dwell time to a saliency value. In some implementations, the saliency value can be binary result that indicates whether the input patch 214 is salient or not. In some implementations, the saliency value can be a value that is a function of the dwell time. For example, a relatively longer dwell time can indicate that the patch 214 is relatively more salient than a patch 214 with a lower dwell time.

The saliency detector 414 can be used to generate heat maps for other digital or otherwise displayed content. For example, the saliency detector 414 can be used to design the layout of websites and other content systems. The saliency detector 414 can be trained by receiving gaze position from eye tracking systems that monitor the motion and gaze position of viewers. The system can then generate a heat map for the website. The system can register the heat map with the location of content on the website. The website and associated heat map can be used as training data for the system's classifier. Once trained, the system can generate predicted heat maps for new input websites. The system can suggest modifications to the layout of the input websites based on the predicted heat maps. For example, if the predicted heat maps indicate viewers of the website are not noticing content the website is promoting, the system can suggest a different layout to improve the likelihood the user will view the content.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

As used herein, the term "about" and "substantially" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all of the described terms. For example, a reference to "at least one of 'A' and 'B'" can include only 'A', only 'B', as well as both 'A' and B'. Such references used in conjunction with "comprising" or other open terminology can include additional items.

Where technical features in the drawings, detailed descriptions, or any claims are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
identifying, by one or more processors, a first plurality of patches from a first digital image of a pathology slide of a tissue sample obtained from a subject, the first digital image acquired via a camera at a magnification factor of a plurality of magnification factors, each of the first plurality of patches comprising a corresponding portion of the first digital image;
determining, by the one or more processors, using a classifier, a first dwell time identifying a predicted amount of time that each patch of the first plurality of patches is to be viewed, the classifier trained using a second plurality of patches of a second digital image and a second dwell time identifying an amount of time that each patch of the second plurality of patches was viewed;
generating, by the one or more processors, a map for the first digital image based on the first dwell time for each patch of the first plurality of patches; and
storing, by the one or more processors, an association between the map and the first plurality of patches of the first digital image.

2. The method of claim 1, further comprising providing, by the one or more processors, for display, the map with the first plurality of patches of the first digital image, the map indicating the first dwell time for each of the first plurality of patches.

3. The method of claim 1, wherein determining the first dwell time further comprises determining, for at least one patch of the first plurality of patches, a plurality of first dwell times for a corresponding plurality of sub-patches from the at least one patch by using the classifier, each of the plurality of first dwell times identifying an estimated amount of time that a sub-patch of the corresponding plurality of sub-patches is to be viewed.

4. The method of claim 1, further comprising categorizing, by the one or more processors, at least one patch of the first plurality of patches as a first classification instead of a second classification based on a comparison between the first dwell time for the at least one patch and a threshold.

5. The method of claim 1, further comprising generating, by the one or more processors, an annotation for each patch of the first plurality of patches based on the corresponding first dwell time.

6. A method, comprising:
identifying, by one or more processors, a first plurality of patches from a first digital image of a pathology slide of a tissue sample obtained from a subject, the first digital image acquired via a camera at a magnification factor of a plurality of magnification factors, each of the first plurality of patches comprising a plurality of pixels from a corresponding portion of the first digital image;
determining, by the one or more processors, a first dwell time for each patch of the first plurality of patches, the first dwell time indicating a first amount of time that a corresponding patch of the first plurality of patches was viewed;
training, by the one or more processors, a classifier to determine a second dwell time identifying a predicted amount of time that each patch of the first plurality of patches is to be viewed, using (i) the first dwell time for each patch of the first plurality of patches and (ii) the plurality of pixels from the corresponding portion of the first digital image; and
using, by the one or more processors, the classifier to generate a map for a second digital image based on a second plurality of patches of the second digital image.

7. The method of claim 6, wherein determining the first dwell time further comprises identifying, for the corresponding patch of the first plurality of patches, at least one of a gaze position or a motion of an eye of an observer viewing the corresponding patch.

8. The method of claim 6, wherein using the classifier further comprises using the classifier to categorize each patch of the second plurality of patches as a first classification instead of a second classification based on a comparison between the second dwell time for each patch and a threshold.

9. The method of claim 6, wherein using the classifier further comprises using the classifier to generate the map, the map identifying, for at least one patch of the first plurality of patches, a plurality of second dwell times for a corresponding plurality of sub-patches from the at least one patch by applying the classifier to each of the plurality of sub-patches.

10. A system, comprising:
one or more processors coupled with memory, configured to:
identify a first plurality of patches from a first digital image of a pathology slide of a tissue sample obtained from a subject, the first digital image acquired via a camera at a magnification factor of a plurality of magnification factors, each of the first plurality of patches comprising a corresponding portion of the first digital image;
determine, using a classifier, a first dwell time identifying a predicted amount of time that each patch of the first plurality of patches is to be viewed, the classifier trained using a second plurality of patches of a second digital image and a second dwell time identifying an amount of time that each patch of the second plurality of patches was viewed;
generate a map for the first digital image based on the first dwell time for each patch of the first plurality of patches; and
store an association between the map and the first plurality of patches of the first digital image.

11. The system of claim 10, wherein the one or more processors are configured to provide, for display, the map with the first plurality of patches of the first digital image, the map indicating the first dwell time for each of the first plurality of patches.

12. The system of claim 10, wherein the one or more processors are configured to determine, for at least one patch of the first plurality of patches, a plurality of first dwell times for a corresponding plurality of sub-patches from the at least one patch by using the classifier, each of the plurality of first dwell times identifying an estimated amount of time that a sub-patch of the corresponding plurality of sub-patches is to be viewed.

13. The system of claim 10, wherein the one or more processors are configured to categorize at least one patch of the first plurality of patches as a first classification instead of a second classification based on a comparison between the first dwell time for the at least one patch and a threshold.

14. The system of claim 10, wherein the one or more processors are configured to generate an annotation for each patch of the first plurality of patches based on the corresponding first dwell time.

\* \* \* \* \*